United States Patent [19]

Suzuki et al.

[11] Patent Number: 4,507,042
[45] Date of Patent: Mar. 26, 1985

[54] CABLE SUPPORT OF A ROBOT

[75] Inventors: Takeo Suzuki; Yoshihiro Yurita; Hideharu Zenpo, all of Kitakyushu, Japan

[73] Assignee: Yaskawa Electric Mfg. Co., Ltd., Fukuoka, Japan

[21] Appl. No.: 432,833

[22] Filed: Oct. 5, 1982

[30] Foreign Application Priority Data

Oct. 7, 1981 [JP] Japan .............................. 56-160756
Oct. 7, 1981 [JP] Japan ........................ 56-149885[U]

[51] Int. Cl.³ .............................................. B25J 9/00
[52] U.S. Cl. ................................... 414/680; 414/918; 901/42; 901/50; 248/49; 248/201
[58] Field of Search ................... 414/918, 729, 680; 137/343; 138/106, 113, 118; 248/49, 80, 81, 201; 901/41, 42, 50

[56] References Cited

U.S. PATENT DOCUMENTS

| 3,543,984 | 12/1970 | Cooper | 901/41 X |
| 4,101,755 | 7/1978 | Uratani | 901/42 X |
| 4,166,941 | 9/1979 | Cecil | 901/42 X |
| 4,249,062 | 2/1981 | Hozumi et al. | 901/42 X |
| 4,283,617 | 8/1981 | Merrick et al. | 901/42 X |

FOREIGN PATENT DOCUMENTS

| 32729 | 8/1977 | Japan | 901/18 |
| 62676 | 5/1981 | Japan | 901/42 |

Primary Examiner—Robert J. Spar
Assistant Examiner—Terrance L. Siemens
Attorney, Agent, or Firm—James J. Ralabate

[57] ABSTRACT

The present invention discloses a cable support which can assure smooth operation of an industrial robot. The cable support is substantially characterized by having a movable support on one end of an operating arm and an auxiliary support on the wrist-side end of the arm respectively, wherein the movable support consists of a first rotary shaft rotatably mounted on the operating arm and a cable holder tiltably mounted on the first rotary shaft and the auxiliary support consists of a second rotary shaft mounted on the operating arm and a cable clamp rotatably mounted on the second rotary shaft.

3 Claims, 3 Drawing Figures

CABLE SUPPORT OF A ROBOT

BACKGROUND OF THE INVENTION

This invention relates to a support for a cable for supplying a welding wire, carbonate gas, or electric power to a working tool of an industrial robot, such as a welder.

In industrial robots, a working tool mounted on the extremity of an operating arm is operated in a three-dimensional locus by means of a plurality of operating arms. Various wires or tubes are necessary for supplying power and operating signals from a controller to the working tool. Conventionally, these wires or tubes are wound in a bundle in a suitable form, or are encased in a common cable or tube and clamped on the operating arm or are suspended from the operating arm or other support means.

These cables and tubes are made of flexible material. However, since they still have a certain degree of rigidity, a necessary slacking must be provided to these cables or wires to assure the movement of the working tool.

However, in a sophisticated robot which operates with high speed and precision, depending on the positioning of cables or tubes, the cable hampers a complicated movement of the operating arm. Furthermore, due to the tensioning or slack of the cable during the movement of the operating arm, a stress or an interference is exerted on the cable which illaffects the operability of the arms and the working tool, thereby the operation with high precision cannot be achieved.

Accordingly, it is an object of the present invention to provide a cable support which assures the robot operation of high precision by eliminating the stress and the interference to the operating arms and the working tool, wherein the improvement is characterized in that a movable support is mounted on the operating arm at the wrist-side end thereof and an auxiliary support is mounted on the operating arm at the opposite end thereof to support the cable and that such supports can freely be rotated and tilted to readily follow the movement of the cable.

DETAILED DESCRIPTION OF DISCLOSURE

Figure 1:
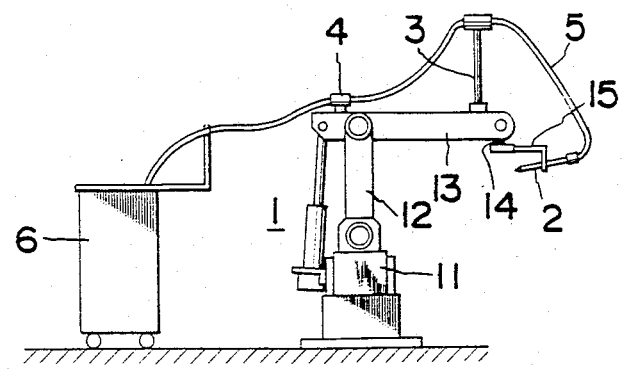
FIG. 1 is a side view of a robot provided with a cable support of the first embodiment of the present invention.

The cable support of this invention is described hereinafter in conjunction with attached drawings.

Numeral 1 indicates a robot having the freedom of five degrees which comprises a turn base 11, a first tilt arm 12 which tilts in a forward and backward direction, a second tilt arm 13 which tilts in an upward direction and downward direction, a wrist arm 14 and a rotating arm 15. A working tool 2 such as a welding torch is attached to the extremity of the rotating arm 15. Numeral 3 indicates a movable support mounted on the upper face of the wrist-side end of the second tilt arm 13, numeral 4 indicates an auxiliary support mounted on the other side of the second tilt arm 13, for example, on the upper face of the arm 13 adjacent to a joint with the first tilt arm 12. Numeral 5 indicates a cable and numeral 6 indicates a welding controller.

The movable support 3 comprises a first rotary shaft 31 which is rotatably mounted on the second tilt arm 13 by means of a bearing 32 at a position adjacent to a joint with the wrist arm 14. The height of this rotary shaft 31 is determined to be higher than the distance between the above joint and the shaft-mounting position.

A cable holder 33 is tiltably mounted on the upper end of the first rotary shaft 31 by means of a lateral pin 34. A second rotary shaft 41 which is shorter than the first rotary shaft 31 is rotatably mounted on the second tilt arm 13 by means of a bearing 42 at a position adjacent to a joint with the first tilt arm 12. A cable clamp 43 is tiltably mounted on the upper end of the second rotary shaft 41 by means of a lateral pin 44.

A cable 5 which has one end connected to the welding controller 6 is overhung on the cable clamp 43 of the auxiliary support 3 with a slack necessary for absorbing the forward-and-backward tilting and the rotation of the robot. The extension of the cable 5 is led to the cable holder 33 of the movable support 3 with another slack and subsequently the cable 5 is connected to the torch 2 with a slack necessary for the movement of the torch 2. Accordingly, the cable 5 is supported in a shape of crown making the cable supporting portion of the movable support 3 as a peak and providing slacks on the cable portions 5a and 5b which dispose at both sides of the peak.

Since the operation of the robot is conducted with a greater drive force as the joint is located farther from the wrist arm provided with the working tool 2, the fluctuation of the cable 5 which occurs due to the operation of the turn base 11, the first tilt arm 13, and the second tilt arm 13 can be almost neglected.

Figure 2:
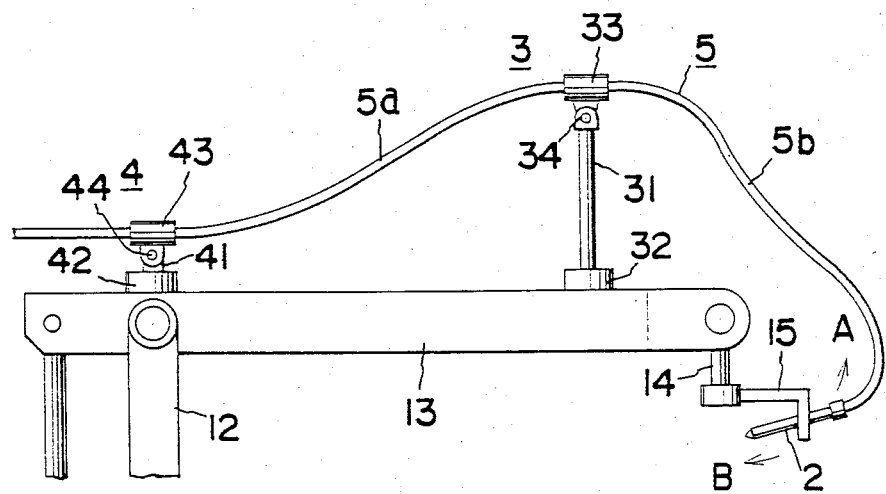
FIG. 2 is an enlarged side view of the cable support.
Figure 3:
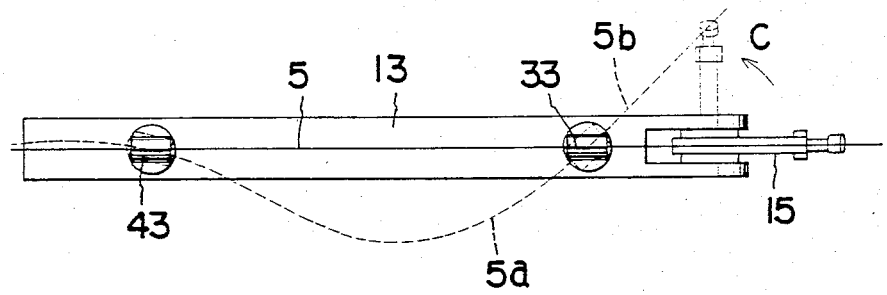
FIG. 3 is an enlarged plan view of the cable support with a cable shown as a line.

Suppose that the torch 2 is moved in an arrow direction of A (FIG. 2), as the torch 2 moves, the slack on the cable portion 5b increases and a stress which tends to bend the cable 5 in an upward direction is exerted at the cable holder 33. The reaction of the stress and the inertia caused by the swinging of the cable 5 are given to the torch 2 so that the operation of the arm wrist 14 becomes unstable.

However, according to the present invention, since the cable holder 33 is tiltable on the lateral pin 34 so that the direction of the cable holder 33 can be made to follow upwardly as shown in a dotted line corresponding to the degree of stress on the cable 5. The deformation of the cable 5a cooperates with the above movement of the cable holder 33 to absorb a shock caused by the bending of the cable 5 at the clamp portion. As to the horizontal swinging of the cable portion 5b, the first rotary shaft 31 is tilted corresponding to the above swinging so as to absorb the inertia of the horizontal movement and to prevent the unnecessary load caused by the movement of the cable 5 from applying to the movement of the torch 2, whereby the torch is smoothly operated.

Suppose that the torch 2 is moved in a direction of arrow B (FIG. 2) by the wrist arm 14, the slack on the cable portion 5b is pulled, and corresponding to this pulling, the cable holder 33 is tilted in a downward direction so as to absorb the shock in the same manner and the smooth operation of the torch 2 is obtained.

When the rotating arm 15 is rotated and the torch 2 is moved in a dotted direction accordingly, the cable portion 5b swings in a slanted direction relative to the axis of the second tilt arm 13. Therefore, the cable holder 33 is rotated on the bearing 32 due to the rigidity of the cable 5 making the cable portion 5a swing in a direction opposed to the swinging direction of the cable portion 5b and also making the cable clamp 43 of the auxiliary support 4 in a direction opposed to the rotating direction of the cable holder 33. Accordingly, the stress caused by the swinging of the cable portion 5b is absorbed by the rotation of the first rotary shaft 31 and the torch 2 can be smoothly operated without suffering the reciprocating vibration and shock.

The cable clamp 43 of the auxiliary support 4 is tilted by the lateral pin 44 along with the movement of or the rotation of the second rotary shaft 41, and the stress which is produced as the cable portion 5a is deformed can be further decreased.

Furthermore, although, in the drawing, the movable support 3 is constructed such that the first rotary shaft 31 is rotatably supported by the bearing 32, the movable support 3 may be constructed such that a rotary shaft may be mounted on a fixed shaft and the cable holder may be tiltably mounted on the rotary shaft. As a further modification, the cable holder may be constructed so as to support the cable slidably therein.

As has been described heretofore, according to the present invention, the cable can readily and smoothly follow the rotation of the movable support, and the rotation and the tilting of the cable clamp and the cable holder, whereby the shock and the stress on the cable caused by the deflection and the vibration of the cable can be effectively absorbed and an undue load on the cable disposed at the wrist portion is efficiently eliminated. Accordingly, the smooth operation of the working tool is assured, the locus of the working tool is accurately maintained and furthermore the cable is firmly supported, and the interference caused by the swinging of the cable at the time of the movement of the operating arm is eliminated, thus realizing the improvement of the precision of the robot operation and the high speed operation.

What we claim is:

1. A cable support of a robot comprising
   (a) an operating arm provided with a wrist arm at one end thereof for supporting a working tool,
   (b) a movable support mounted on a wrist-side end of said operating arm, said movable support consisting of a first rotary shaft rotatably mounted on said operating arm and a cable holder tiltably supported on said first rotary shaft,
   (c) an auxiliary support mounted on other end of said operating arm, said auxiliary support consisting of a second rotary shaft rotatably mounted on said operating arm and a cable clamp mounted on said second rotary shaft at a height lower than a mounting position of said cable holder, and
   (d) a cable overhanging on said cable clamp and on said cable holder and connected to said working tool.

2. A cable support of a robot according to claim 1, wherein said cable is slidably supported on said cable holder.

3. A cable support of a robot according to claim 1, wherein said cable clamp of said auxiliary support is tiltably mounted on said second rotary shaft.

* * * * *